(12) United States Patent
Lugert et al.

(10) Patent No.: US 12,042,112 B2
(45) Date of Patent: Jul. 23, 2024

(54) DOMESTIC DISHWASHER

(71) Applicant: BSH Hausgeräte GmbH, Munich (DE)

(72) Inventors: Michael Lugert, Jettingen-Scheppach (DE); Bernd Eisenbart, Holzheim (DE); Werner Oblinger, Mödingen (DE)

(73) Assignee: BSH Hausgeräte GmbH, Munich (DE)

( * ) Notice: Subject to any disclaimer, the term of this patent is extended or adjusted under 35 U.S.C. 154(b) by 317 days.

(21) Appl. No.: 17/427,935

(22) PCT Filed: Jul. 16, 2020

(86) PCT No.: PCT/EP2020/070105
§ 371 (c)(1),
(2) Date: Aug. 3, 2021

(87) PCT Pub. No.: WO2021/018610
PCT Pub. Date: Feb. 4, 2021

(65) Prior Publication Data
US 2022/0022722 A1     Jan. 27, 2022

(30) Foreign Application Priority Data
Jul. 31, 2019 (DE) .................... 10 2019 211 433.4

(51) Int. Cl.
*A47L 15/42* (2006.01)
*A47L 15/23* (2006.01)
(Continued)

(52) U.S. Cl.
CPC ........... *A47L 15/4208* (2013.01); *A47L 15/23* (2013.01); *A47L 15/4204* (2013.01);
(Continued)

(58) Field of Classification Search
CPC .. A47L 15/4225; A47L 15/4208; A47L 15/23; A47L 15/4204; C02F 1/001;
(Continued)

(56) References Cited

U.S. PATENT DOCUMENTS 4,972,861 A * 11/1990 Milocco .............. A47L 15/4208
210/411
5,333,631 A * 8/1994 Kirkland ............. A47L 15/4208
134/179
(Continued)

FOREIGN PATENT DOCUMENTS

DE      4435096 A1    4/1996
DE      69404485 T2   12/1997
(Continued)

OTHER PUBLICATIONS

National Search Report DE 10 2019 211 433.4 dated Apr. 3, 2020.
(Continued)

*Primary Examiner* — Benjamin L Osterhout
(74) *Attorney, Agent, or Firm* — Michael E. Tschupp; Andre Pallapies; Brandon G. Braun

(57) ABSTRACT

A household dishwasher includes a washing container for holding a dishwasher load, a sump arranged at a bottom of the washing container, a filter system provided at the sump, and a spray arm for applying washing liquor and/or fresh water to the dishwasher load. The spray arm includes an extension piece which is mounted on the sump for rotation about a first axis of rotation and includes a filter cleaning nozzle for cleaning the filter system with the aid of the washing liquor and/or fresh water, and a spray arm satellite which is mounted on the extension piece for rotation about a second axis of rotation.

10 Claims, 2 Drawing Sheets

(51) Int. Cl.
*B01D 29/01* (2006.01)
*B01D 29/64* (2006.01)
*C02F 1/00* (2023.01)
*C02F 103/00* (2006.01)

(52) U.S. Cl.
CPC .......... *A47L 15/4225* (2013.01); *B01D 29/01* (2013.01); *B01D 29/6446* (2013.01); *C02F 1/001* (2013.01); B01D 2201/081 (2013.01); C02F 2103/002 (2013.01); C02F 2303/16 (2013.01); C02F 2307/12 (2013.01)

(58) Field of Classification Search
CPC ............ C02F 2103/002; C02F 2307/12; C02F 2303/16; B01D 29/6446; B01D 29/01; B01D 2201/081
See application file for complete search history.

(56) References Cited

U.S. PATENT DOCUMENTS

| | | | | |
|---|---|---|---|---|
| 5,429,679 | A * | 7/1995 | Young, Jr. | A47L 15/0002 134/10 |
| 5,464,482 | A | 11/1995 | Michael | |
| 5,477,874 | A | 12/1995 | Yukio | |
| 5,700,329 | A | 12/1997 | Dries | |
| 6,432,216 | B1 * | 8/2002 | Thies | A47L 15/0049 134/25.2 |
| 8,449,690 | B2 * | 5/2013 | Jeong | A47L 15/4208 134/184 |
| 9,986,884 | B2 * | 6/2018 | Ryu | A47L 15/4289 |
| 10,512,386 | B2 * | 12/2019 | Boyer | A47L 15/4219 |
| 2002/0014260 | A1 | 2/2002 | Yeong | |
| 2005/0051201 | A1 * | 3/2005 | Ashton | A47L 15/0084 134/179 |
| 2006/0237049 | A1 * | 10/2006 | Weaver | A47L 15/4221 134/25.2 |
| 2006/0237050 | A1 * | 10/2006 | Weaver | A47L 15/4208 134/10 |
| 2009/0120470 | A1 * | 5/2009 | Yoon | A47L 15/4219 134/109 |
| 2014/0069462 | A1 * | 3/2014 | Becker | A47L 15/4219 134/10 |

FOREIGN PATENT DOCUMENTS

| | | |
|---|---|---|
| EP | 0068974 A1 | 1/1983 |
| GB | 2204482 A | 11/1988 |
| JP | H04164430 A | 6/1992 |

OTHER PUBLICATIONS

International Search Report PCT/EP2020/070105 dated Sep. 16, 2020.
National Search Report CN 2020800555371 dated Sep. 25, 2023.

\* cited by examiner

DOMESTIC DISHWASHER

CROSS-REFERENCES TO RELATED APPLICATIONS

This application is the U.S. National Stage of International Application No. PCT/EP2020/070105, filed Jul. 16, 2015, which designated the United States and has been published as International Publication No. WO 2021/018610 A1 and which claims the priority of German Patent Application, Serial No. 10 2019 211 433.4, filed Jul. 31, 2019, pursuant to 35 U.S.C. 119(a)-(d).

BACKGROUND OF THE INVENTION

The present invention relates to a household dishwasher.

A dishwasher comprises a washing container in which a dishwasher load that requires to be cleaned can be held. A rotatable spray arm, by means of which washing liquor and/or fresh water can be applied to the dishwasher load that is held in the washing container, can be provided in the washing container. The washing container comprises a bottom at which a filter system is provided. During use of the dishwasher, the filter system becomes clogged with food remnants over time and must be cleaned manually.

BRIEF SUMMARY OF THE INVENTION

Taking this as a point of departure, the object of the present invention is to provide an improved household dishwasher.

A household dishwasher is proposed accordingly, having a washing container, a sump which is arranged at a bottom of the washing container, a filter system which is provided at the sump, and a spray arm for applying washing liquor and/or fresh water to a dishwasher load held in the washing container. The spray arm in this case comprises an extension piece which is mounted on the sump and can rotate about a first axis of rotation, and a spray arm satellite which is mounted on the extension piece and can rotate about a second axis of rotation, wherein the extension piece has a filter cleaning nozzle for cleaning the filter system with the aid of the washing liquor and/or fresh water.

As a result of providing the filter cleaning nozzle, it is possible to dispense with manual cleaning of the filter system, in particular a flat filter or fine filter of the filter system. This increases the operating convenience of the household dishwasher.

In addition to the bottom, the washing container preferably comprises a top which is arranged opposite the bottom, a door which can be swung open, a back panel which is arranged opposite the closed door, and two side panels. The spray arm is preferably provided at the bottom. The spray arm is arranged inside the washing container. The filter system preferably comprises a fine filter and a coarse filter. The filter cleaning nozzle is suitable in particular for cleaning the fine filter. The sump is covered by the filter system. The filter system can be connected to the sump. The sump is fastened to the bottom in particular. The sump preferably comprises a tubular sump dome, in or on which the extension piece is rotatably mounted. The spray arm being suitable for "applying" washing liquor and/or fresh water to the dishwasher load is understood in this context to mean that the dishwasher load is wetted with washing liquor and/or fresh water by means of the spray arm. "Washing liquor" can be understood in this context to mean water to which a detergent has been added. The washing liquor can also contain soiling that has become detached from the dishwasher load.

According to an embodiment variant, the spray arm satellite has spray nozzles, wherein the filter cleaning nozzle of the extension piece points towards the bottom and the spray nozzles of the spray arm satellite point away from the bottom.

This means that the filter cleaning nozzle is provided on the lower side of the spray arm and the spray nozzles are provided on the upper side of the spray arm. The spray arm satellite can have additional spray nozzles which point towards the bottom. Likewise, the extension piece can have additional spray nozzles which point towards the bottom or the top of the washing container.

According to a further embodiment variant, a lower edge of the extension piece, said lower edge facing towards the bottom, and a lower edge of the spray arm satellite, said lower edge facing towards the bottom, are positioned at the same height viewed along the first axis of rotation.

It is thereby possible reliably to prevent a collision of the extension piece with components provided at the bottom of the washing container, e.g. the coarse filter, a supply tube, a water softener cover or other components. The "lower edge" represents in each case an outermost point of the extension piece and of the spray arm satellite.

According to a further embodiment variant, an upper side of the extension piece, said upper side facing away from the bottom, and an upper side of the spray arm satellite, said upper side facing away from the bottom, are positioned at the same height viewed along the first axis of rotation.

The spray arm satellite is thereby prevented from projecting above the upper side of the extension piece. This results in a particularly compact structural shape of the spray arm viewed along the first axis of rotation.

According to a further embodiment variant, the extension piece comprises a first arm, on which the spray arm satellite is mounted and can rotate about the second axis of rotation, and a second arm, on which the filter cleaning nozzle is provided.

The number of arms of the extension piece is unlimited in principle. However, it is particularly preferable to provide precisely two arms. The first arm and the second arm are designed as a single piece in particular, and are preferably materially integral. "Single piece" is understood in this context to mean that the first arm and the second arm form a common component and are not composed of different components. "Materially integral" is understood in this context to mean that the first arm and the second arm are manufactured entirely from the same material. However, this does not preclude the arms being composed of two half shells which are permanently connected together, in particular by means of encapsulation or alternatively by bonding.

According to a further embodiment variant, the first arm and the second arm are positioned at different heights viewed along the first axis of rotation.

This results in a stepped geometry of the extension piece.

According to a further embodiment variant, the filter cleaning nozzle is configured to produce a spray jet which is oriented obliquely relative to the first axis of rotation.

By this means, the washing liquor and/or the fresh water is sprayed obliquely onto the filter system. Food remnants can thereby be removed particularly effectively. This improves the cleaning result.

According to a further embodiment variant, the spray arm satellite is reactively driven by means of the washing liquor and/or the fresh water.

"Reactively driven" is understood in this context to mean that the spray arm satellite is caused to rotate by means of the washing liquor and/or fresh water emerging from the spray nozzles thereof. The spray arm satellite can also have additional driving spray nozzles for this purpose.

According to a further embodiment variant, the extension piece is actively driven or reactively driven.

The extension piece being "actively driven" is understood in this context to mean that a drive entity is provided in order to cause the extension piece to rotate. Alternatively, the extension piece can also be not actively driven, but reactively driven.

According to a further embodiment variant, the household dishwasher further comprises a drive entity for actively driving the extension piece, wherein the drive entity is configured to perform a filter cleaning program during which the extension piece remains in a predefined angular position for the purpose of cleaning the filter system and/or during which the extension piece moves back and forth between two different predefined angular positions.

For example, during the filter cleaning program, the extension piece can wet the fine filter of the filter system via a forward and backward motion within a semicircular path. Stopping occasionally for a defined time at specific angular positions of the fine filter is also possible. Automatic execution of the filter cleaning program can be provided within each wash cycle. Alternatively, the filter cleaning program can be performed after a predefined number of wash cycles or the user can select the filter cleaning program manually in addition to the wash cycle. Markedly improved filter cleaning can be achieved thus. "Predefined" in this case means that the angular positions are predetermined by the filter cleaning program, for example.

Further possible implementations of the household dishwasher comprise other combinations that are not explicitly cited of features or embodiment variants described in the foregoing or below in relation to the exemplary embodiments. In this way, a person skilled in the art will also add individual aspects as improvements or additions to the respective basic form of the household dishwasher.

BRIEF DESCRIPTION OF THE DRAWINGS

Further advantageous developments and aspects of the household dishwasher are the subject matter of the subclaims and of the exemplary embodiments described below in respect of the household dishwasher. The household dishwasher is explained in greater detail below with reference to preferred embodiment variants and to the appended figures, in which:

DETAILED DESCRIPTION OF EXEMPLARY EMBODIMENTS OF THE PRESENT INVENTION

Identical or functionally identical elements are denoted by the same reference signs in the figures unless otherwise specified.

Figure 1:
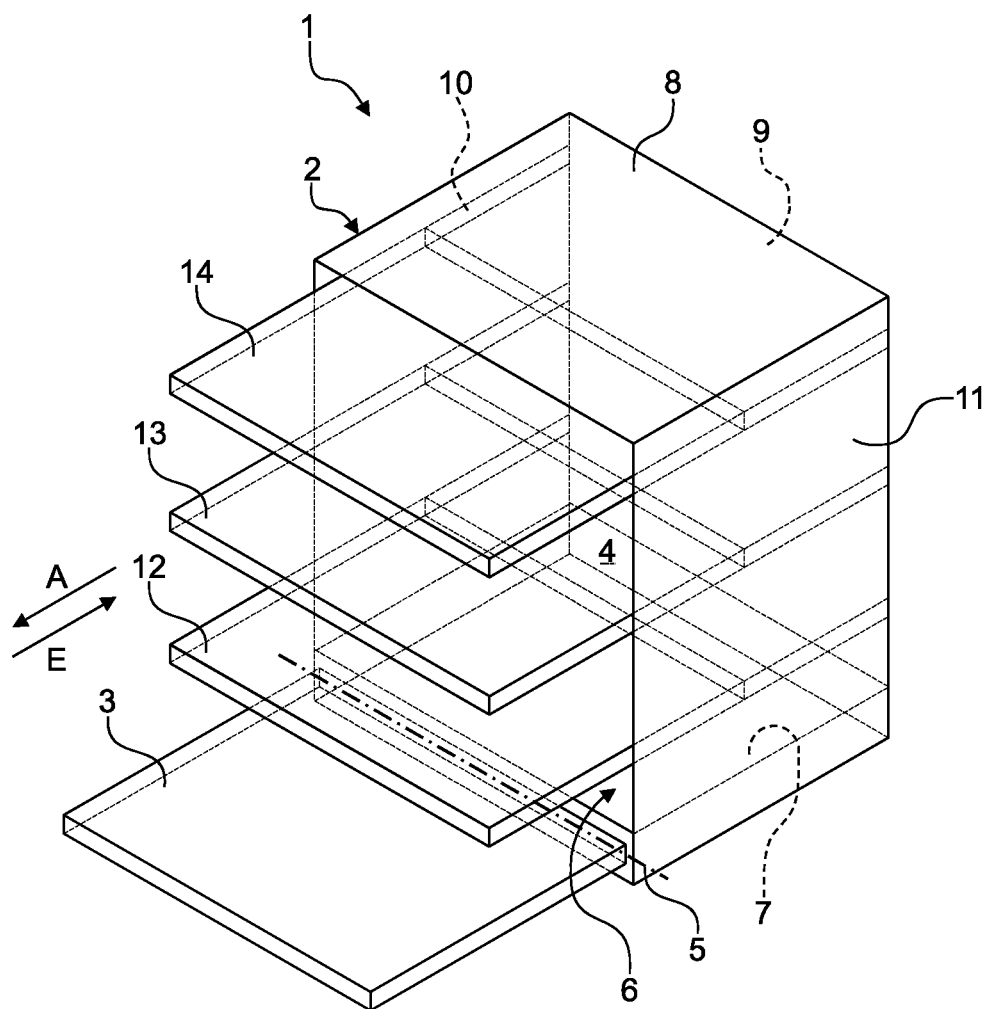
FIG. 1 shows a schematic perspective view of an embodiment variant of a household dishwasher.

FIG. 1 shows a schematic perspective view of an embodiment variant of a household dishwasher 1. The household dishwasher 1 comprises a washing container 2 which can be closed by a door 3, in particular in a watertight manner. A sealing entity can be provided between the door 3 and the washing container 2 for this purpose. The washing container 2 is preferably cuboid. The washing container 2 can be arranged in a housing of the household dishwasher 1. The washing container 2 and the door 3 can form a dishwasher interior 4 for washing a dishwasher load.

The door 3 is illustrated in its open position in FIG. 1. Closing or opening the door 3 can be achieved by swinging about a hinge axis 5 provided at a lower end of the door 3. A loading access 6 of the washing container 2 can be closed or opened by means of the door 3. The washing container 2 has a bottom 7, a top 8 which is arranged opposite the bottom 7, a back panel 9 which is arranged opposite the closed door 3, and two side panels 10, 11 arranged opposite each other. The bottom 7, the top 8, the back panel 9 and the side panels 10, 11 can be manufactured from a stainless steel sheet, for example. Alternatively, the bottom 7 can be manufactured from a plastic material, for example.

The household dishwasher 1 further comprises at least one dishwasher loading rack 12 to 14. A plurality of dishwasher loading racks 12 to 14 can preferably be provided, e.g. three, wherein the dishwasher loading rack 12 can be a lower dishwasher loading rack or lower basket, the dishwasher loading rack 13 can be an upper dishwasher loading rack or upper basket, and the dishwasher loading rack 14 can be a cutlery drawer. It is also evident in FIG. 1 that the dishwasher loading racks 12 to 14 are arranged one above the other in the washing container 2. Each dishwasher loading rack 12 to 14 can be moved into or out from the washing container 2. In particular, each dishwasher loading rack 12 to 14 can be pushed into or slid into the washing container 2 in a push-in direction E and pulled out or slid out from the washing container 2 in a pull-out direction A which is opposite to the push-in direction E.

Figure 2:
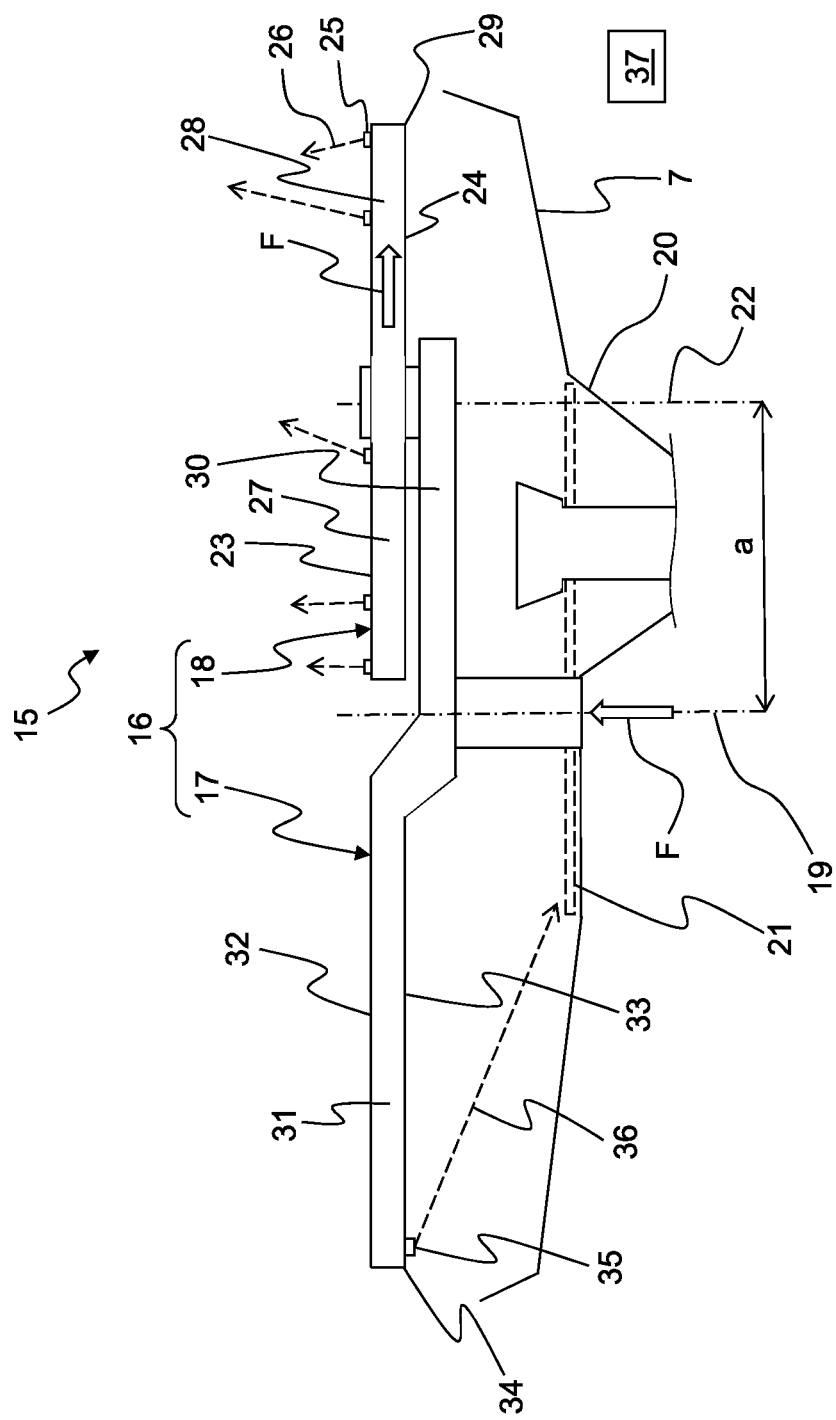
FIG. 2 shows a schematic side view of an embodiment variant of a spray device for the household dishwasher according to FIG. 1.

FIG. 2 shows a schematic side view of an embodiment variant of a spray device 15 for the household dishwasher 1. The spray device 15 is preferably provided at the bottom 7 of the washing container 2. The spray device 15 has a rotatably mounted spray arm 16, which comprises an extension piece 17 and a spray arm satellite 18 that is rotatably mounted on the extension piece 17. The extension piece 17 is mounted on a sump 20 of the household dishwasher 1 and can rotate about a first axis of rotation 19. The sump 20 is provided at the bottom 7. The sump 20 is covered by a filter system 21. The filter system 21 can comprise a coarse filter and a fine filter. The fine filter is a flat filter or can be referred to as a flat filter.

The spray arm satellite 18 is mounted on the extension piece 17 and can rotate about a second axis of rotation 22. The axes of rotation 19, 22 are so arranged as to be parallel to each other and separated from each other by a distance a. The spray arm satellite 18 has an upper side 23 facing away from the bottom 7 and a lower side 24 facing towards the bottom 7. Provided on the upper side 23 are a multiplicity of spray nozzles 25 which face away from the bottom 7 and towards the top 8. In FIG. 2, only one of the spray nozzles 25 is denoted by a reference sign.

The spray nozzles 25 are suitable for producing spray jets 26 by means of which washing liquor and/or fresh water F can be applied to a dishwasher load (not shown). In particular, the spray nozzles 25 are only provided on the upper side of the spray arm satellite 18. Alternatively, the spray nozzles 25 can also be so arranged as to point towards the bottom 7. Furthermore, the spray arm satellite 18 can also have spray nozzles 25 on both upper side and lower side.

The spray arm satellite 18 has a plurality of arms 27, 28. The number of arms 27, 28 is unlimited. For example, provision is made for three such arms 27, 28 which are so arranged as to be separated from each other by an angle at the circumference of 120°. Each of the arms 27, 28 has an outermost lower edge 29 which faces towards the bottom 7.

The extension piece 17 comprises a first arm 30, on which the spray arm satellite 18 is so mounted as to be rotatable about the second axis of rotation 22. The extension piece 17 further comprises a second arm 31. The first arm 30 and the second arm 31 are arranged at different heights viewed along the first axis of rotation 19. In particular, the first arm 30 is arranged closer to the bottom 7 than the second arm 31.

The second arm 31 has an upper side 32 and a lower side 33 which faces away from the upper side 32. The upper side 32 faces towards the top 8. The lower side 33 faces towards the bottom 7. The upper side 32 is arranged at the same height as the upper side 23 of the spray arm satellite 18 viewed along the first axis of rotation 19. An outermost lower edge 34 of the extension piece 17, in particular of the second arm 31, is arranged at the same height as the lower edge 29 of the spray arm satellite 18 viewed along the first axis of rotation 19.

Furthermore, a filter cleaning nozzle 35 for cleaning the filter system 21 is provided on the lower side 33. The filter cleaning nozzle 35 is configured to produce a spray jet 36 which is oriented obliquely relative to the first axis of rotation 19 and towards the filter system 21.

The extension piece 17 can also have additional spray nozzles. This is however not essential. The extension piece 17 is actively driven. "Actively driven" in this context is understood to mean that the spray arm 16, in particular the extension piece 17, is assigned a drive entity 37, e.g. comprising an electric motor, which is suitable for causing the extension piece 17 to rotate about the first axis of rotation 19. However, the extension piece 17 can alternatively be reactively driven.

By contrast, the spray arm satellite 18 is not actively driven. In particular, the spray arm satellite 18 is caused to rotate by the spray jets 26 emerging from the spray nozzles 25. Provision can also be made for special driving spray nozzles.

By means of the drive entity 37, a filter cleaning program can be performed in which the extension piece 17 remains in a predefined angular position for the purpose of cleaning the filter system 21 and/or during which the extension piece 17 moves back and forth between two different predefined angular positions. "Predefined" in this case means that the angular positions are predetermined by the filter cleaning program, for example.

By virtue of the lower edges 29, 34 being arranged at the same height viewed along the first axis of rotation 19, it is possible to prevent the extension piece from colliding with e.g. a coarse filter, a supply tube or a water softener cover of the household dishwasher 1. The danger of a collision would exist if the arms 30, 31 of the extension piece 17 were positioned at the same height, and therefore the outer edges 29, 34 were positioned at different heights, viewed along first axis of rotation 19. By virtue of the geometry described above in relation to the extension piece 17, such a collision is reliably prevented.

By means of the filter cleaning program, the extension piece 17 with the aid of the filter cleaning nozzle 35 and therefore with the aid of the spray jet 36 can wet the fine filter of the filter system 21 via a forward and backward motion of the extension piece 17 within a semicircular path. It is moreover possible to stop occasionally for a defined time at specific angular positions on the fine filter of the filter system 21. The filter system 21 is reliably cleaned thereby.

Automatic execution of the filter cleaning program can also be provided within each wash cycle. Alternatively, the filter cleaning program can be manually selected by the user after a specific number of wash cycles or in addition to the normal wash cycle. Improved and automated cleaning of the filter system 21 can be achieved thus.

Although the present invention is described with reference to exemplary embodiments, it can be modified in many different ways.

The invention claimed is:

1. A household dishwasher, comprising:
a washing container for holding a dishwasher load;
a sump arranged at a bottom of the washing container;
a filter system connected to and covering the sump, wherein the filter system is a flat filter; and
a spray arm for applying washing liquor and/or fresh water to the dishwasher load, said spray arm comprising an extension piece which is mounted on the sump for rotation about a first axis of rotation and which comprises a filter cleaning nozzle for cleaning the filter system with the washing liquor and/or fresh water, and a spray arm satellite which is mounted on the extension piece for rotation about a second axis of rotation.

2. The household dishwasher of claim 1, wherein the spray arm satellite includes spray nozzles, said filter cleaning nozzle of the extension piece pointing towards the bottom, and said spray nozzles of the spray arm satellite pointing away from the bottom.

3. The household dishwasher of claim 1, wherein the extension piece includes a lower edge which faces towards the bottom, and the spray arm satellite includes a lower edge which faces towards the bottom, with the lower edge of the extension piece and the lower edge of the spray arm satellite positioned at a same height viewed along the first axis of rotation.

4. The household dishwasher of claim 1, wherein the extension piece includes an upper side which faces away from the bottom, and the spray arm satellite includes an upper side which faces away from the bottom, with the upper side of the extension piece and the upper side of the spray arm satellite positioned at a same height viewed along the first axis of rotation.

5. The household dishwasher of claim 1, wherein the extension piece comprises a first arm, on which the spray arm satellite is mounted for rotation about the second axis of rotation, and a second arm, on which the filter cleaning nozzle is provided.

6. The household dishwasher of claim 5, wherein the first arm and the second arm are positioned at different heights viewed along the first axis of rotation.

7. The household dishwasher of claim 1, wherein the filter cleaning nozzle is oriented toward the filter system such that the filter cleaning nozzle is configured to produce a spray jet which is oriented to obliquely spray, relative to the first axis of rotation, washing liquor or fresh water onto the filter system.

8. The household dishwasher of claim 1, wherein the spray arm satellite is reactively driven by the washing liquor and/or the fresh water.

9. The household dishwasher of claim 1, wherein the extension piece is actively driven or reactively driven.

10. The household dishwasher of claim 9, further comprising a drive entity for actively driving the extension piece, said drive entity being configured to perform a filter cleaning program during which the extension piece remains in a predefined angular position for cleaning the filter system and/or during which the extension piece moves back and forth between two different predefined angular positions.

* * * * *